(12) United States Patent
Hackl et al.

(10) Patent No.: US 8,399,599 B2
(45) Date of Patent: Mar. 19, 2013

(54) METHOD AND APPARATUS FOR PROCESSING OF PLASTIC MATERIAL

(75) Inventors: Manfred Hackl, Linz (AT); Gerhard Wendelin, Linz (AT); Klaus Feichtinger, Linz (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 0 days.

(21) Appl. No.: 12/672,987

(22) PCT Filed: Aug. 14, 2008

(86) PCT No.: PCT/AT2008/000289
§ 371 (c)(1),
(2), (4) Date: Jun. 24, 2011

(87) PCT Pub. No.: WO2009/021260
PCT Pub. Date: Feb. 19, 2009

(65) Prior Publication Data
US 2011/0251368 A1 Oct. 13, 2011

(30) Foreign Application Priority Data
Aug. 14, 2007 (AT) ................. A 1276/2007

(51) Int. Cl.
*C08G 63/00* (2006.01)
*C08G 69/08* (2006.01)
(52) U.S. Cl. .................... 528/308.3; 422/134

(58) Field of Classification Search .............. 422/134; 528/308.3
See application file for complete search history.

(56) References Cited

U.S. PATENT DOCUMENTS

| 1,636,033 A | 7/1927 | Agnew |
| 2,762,572 A | 9/1956 | Lykken et al. |

FOREIGN PATENT DOCUMENTS

| DE | 1 170 226 B | 5/1964 |
| DE | 25 47 008 A1 | 5/1976 |
| GB | 834892 A | 5/1960 |
| WO | WO 2006/079128 A1 | 8/2006 |

*Primary Examiner* — Terressa Boykin
(74) *Attorney, Agent, or Firm* — Kilpatrick Townsend & Stockton LLP

(57) ABSTRACT

The invention relates to an apparatus and a method for the processing of plastic material, with a receptacle or cutter-compactor (1) into which the material to be treated can be introduced, in the lower region of which a discharge opening (10) is provided, through which the processed material can be ejected from the receptacle (1), for example into an extruder (11). According to the invention, the receptacle (1) is divided into at least two chambers (6a, 6b, 6c, . . . ) separated from each other by an intermediate base (2', 2", . . . ), wherein at least one mixing or comminution tool (7a, 7b, 7c, . . . ) is arranged which acts upon the material in each chamber (6a, 6b, 6c, . . . ), with which the material can be converted into a softened but permanently lumpy or particle-shaped and not melted state and wherein means (5', 5", . . . ) are provided which effect or permit an exchange or a transfer of the softened, lumpy, not melted material between each directly adjacent chamber (6a, 6b, 6c, . . . ).

16 Claims, 4 Drawing Sheets

METHOD AND APPARATUS FOR PROCESSING OF PLASTIC MATERIAL

CROSS-REFERENCES TO RELATED APPLICATIONS

This application is a National Stage of International Application No. PCT/AT2008/000289 filed Aug. 14, 2008, and which claims the benefit of Austrian Patent Application No. A 1276/2007, filed Aug. 14, 2007, the disclosures of which are incorporated herein by reference.

BACKGROUND

The invention relates to an apparatus and a method for processing plastic material.

Devices for processing and pre-treatment of plastic materials are known, for example, from EP 390 873. Such devices generally operate in satisfactory fashion, but it has been shown that in some cases the plastic material carried off via the worm gear is not sufficiently homogeneous, especially in regard to the obtained extent of drying of such plastic materials which must already be fully dry before plastification, for example polyester, to avoid decomposition processes. Thicker foils in addition require expense in drying that goes up as the thickness increases, owing to which, for such goods, separate drying processes such as with dehydrated air, are necessary in special dryers. These dryers operate in a temperature range for which only crystallized goods are permitted; amorphous goods would become sticky and agglomerate. This means that a crystallization process must precede the drying process. But if the goods to be processed are subjected to lengthy treatment in the container by the tool, then with the device in continuous operation, a danger arises that individual plastic particles are caught very early by the removing worm gear, while other plastic particles are caught very late. The plastic particles caught early may still be relatively cold and therefore may not have been given sufficient pre-treatment, dried, crystallized or softened, possibly resulting in inhomogeneities in the material fed through the worm gear to the attached tool, such as an extruder.

To solve this problem, mechanisms have been created such as are known from AT 396 900 B. Through such devices, the homogeneity of the material can be improved. Two or more containers are situated in a series and the plastic material to be processed runs through these containers in turn. In the first container, already pre-comminuted, pre-heated, pre-dried and pre-densified, and thus pre-homogenized material is generated, which is fed to the following container. By this means it is ensured that no untreated, i.e. cold, uncompacted, uncomminuted or inhomogeneous material passes directly to the removal worm gear or to the extruder. It is true that such devices with multiple containers are bulky and take up much space. Also, the design expense, especially in the linking of the containers, is considerable.

With all of the treatment procedures, it must always be kept in mind that plastic amounts either not treated or inadequately treated form inhomogeneous plastic nests in the worm gear, which is detrimental to the quality of the end product. If therefore one desires to obtain end products, whether they be granulates or items extruded into shapes, with the desired quality retained, then the worm gear that transports the inadequately prepared material out of the receptacle must bring the entirety of the material fed by it at the worm gear outlet to the desired quality and temperature, to be able to extrude the material with the desired homogeneity. This initial temperature must be kept relatively high in order to assure that all the plastic particles are sufficiently plasticized. This in turn entails high energy expense and in addition that thermal damage to the plastic material, such as breakdown of the molecular chain length, is to be feared due to the relatively high initial temperature.

In addition, from prior art from AT 407 970 B, a mechanism is known in which the material to be processed is processed continuously in the same receptacle by means of two sets of tools situated one above the other in two successive stages. In the first, by means of the stage carried out of the upper tool set, the material is pre-comminuted and/or preheated and/or pre-dried and/or premixed. In the second stage carried out by means of the lower tool set, the material obtains the same treatment, but less intensively. Material is exchanged between the first and second stage via a permanently open annular gap that is formed between the container wall and a carrier disk. It is true that owing to the friction of the material occurring there between the container wall and carrier disk, the annular gap is not advantageous and not able to be comminuted at will. In addition, the size of the annular gap cannot be altered. With larger containers of this design, the overall open area between the stages is larger than necessary, which leads to an expanded dwell time spectrum of the material.

SUMMARY

Thus an object of the invention is to improve devices of the type mentioned initially, and to create an energy-efficient device that delivers a material with good, homogeneous quality while not taking up much space. In addition, another object of the invention is to produce an advantageous procedure by which lumpy plastic material can be treated efficiently and in a space-saving manner.

In advantageous fashion, the apparatus disclosed herein ensures that freshly inserted, insufficiently treated or pre-treated material is prevented from getting into the removal worm gear without being sufficiently processed, through which the device and its operation are considerably simplified. This is ensured by intermediate bases inserted into the container and subdividing it into chambers, whereby means are provided that cause or permit an exchange of the lumpy, softened, unmelted material between the immediately adjacent stages or planes or chambers. Thus the zone where the material is predominantly comminuted or dried or preheated is separated from the zone where the material is compressed into the worm gear housing. With this, after a brief time of operation, an equilibrium is created between the zones. This contributes to ensuring a sufficient dwell time of the material in the receptacle, especially in its area above the intermediate base. Thus, the temperature of the material inserted into the removal opening of the receptacle is homogenized, since in essence all of the plastic parts found in the receptacle are sufficiently preprocessed. The approximately constant temperature of the material being fed into the worm gear housing brings the result that the inhomogeneous nests of plastic in the extruder worm gear are largely eliminated, and thereby the worm gear lengths are kept smaller than with the known designs, since the worm gear needs to apply less work to bring the plastic material with certainty to the same plastifier temperature. The constant entry temperature of the plastic material into the worm gear housing also results in a uniform pre-densification of the material in the worm gear housing, which has a favorable effect on the conditions at the extruder opening, especially in the form of a uniform extruder throughput and a uniform material quality at the extruder output. The curtailed worm gear length results in an energy saving and processing temperature in the extruder than is lower in comparison to the known designs, since the average entry temperature on the entry end of the worm gear is more uniform than with the known designs. Thus with the subject of the invention, the processed plastic material—viewed over the entire processing sequence—can be processed at a temperature that is lower in comparison to other designs, to have the security of a sufficient plastification. This reduction in peak temperatures results in the energy saving mentioned at the outset, and in addition avoids thermal damage to the processed materials.

In addition, owing to such a device, the processing of the material can be controlled and adapted in dependence on the type of plastic. Thus it is advantageous with PET to achieve an increase in viscosity (iV). With other plastics, for example HDPE or polycarbonate, it is also advantageous to detoxify the plastic material and to free it from volatile components and remove these from the material stream. This in advantageous fashion can be ensured by the device disclosed herein. Owing to the fact that the individual stages or levels in essence are partitioned off from each other, movement of volatile components from one level to another cleaner level is minimized. If the volatile components in each plane are stripped out or removed by suction, in this way the material can obtain increased purity.

In addition, owing to the intermediate bases used, the material column is lessened in height over the moved tools or mixing devices. By this means, mechanical loading on the tools is reduced and the maintenance intervals for the mixing tools along with their service life are extended. In addition this leads to better control when energy is put into the material, through which one can more easily get up to the highest permissible temperature for the material to be processed. With this the highest permissible temperature is the temperature at which the material is in a softened, doughy state, but has not yet melted on. Adjustment of this temperature is very sensitive, because too high a temperature would lead to melting on and baking together. The temperature is applied through the mixing and stirring tools and is also especially controlled thereby. In addition the mixing and stirring tools perform a mixing through that prevents getting stuck together. Thus it is advantageous to regulate the temperature as quickly and precisely as possible, which can be ensured by subdividing the entire receptacle into individual smaller mixing spaces that are easy to inspect in advantageous fashion. By setting a maximum permissible temperature and the certainty of also being able to maintain this temperature and rapidly adapt it, the diffusion rates of the volatile components to be removed are improved, and the purity is further improved.

In summary this means that owing to the intermediate bases employed, material exchange in the flow direction from one level to the next is reduced, by which the passage of the lumpy material through is decelerated and the dwell spectrum is narrowed.

Thus it is advantageous if the chambers are situated above each other and the material flows by gravity from top to bottom. In this way, with structurally simple interchange media or even just with openings, without additional feed devices, sufficiency can be found.

In addition it can be advantageous if the chambers differ in diameter and/or height. According to a preferred embodiment, as seen in the direction of flow of the lumpy material, the upper chamber into which the material is inserted has the greatest diameter and if necessary also the smallest height, in comparison to the other chambers that lie below as seen in the flow direction. In this way, processing of the not completely molten material can effectively be influenced. In addition, the receiving capacity in the topmost container is increased. Formation of a topmost chamber with a large diameter also offers an advantage in that in this way, the plastic material can be processed effectively and with adaptation to the particular circumstances, especially comminution and pre-homogenization.

A further advantageous configuration relates to formation of mixing and comminution tools. In this regard it is advantageous that these be so configured that by that means the material is moved, placed in rotation, mixed, heated, comminuted and/or brought into a softened state, without the material melting. Thus the mixing and comminution tools must receive the material in a lumpy or particle-forming state and dry and/or precrystallize it if needed.

The mixing and comminution tools can be configured differently in the particular chambers and/or be controllable and driven independently of each other via one or more drives, especially at differing r.p.m.s. In this way, by choosing the correct r.p.m. and the correct tool, for example, a great deal of energy can be put quickly into the fresh material. By this means the material is quickly heated and any moisture contained can quickly be removed with the aid of a vacuum or dried inert gas. Thus in the chamber lying below, considerably less energy needs to be put into the material, by which other tool configurations can be used in this chamber, which if necessary operate at different r.p.m. This guarantees the largest possible variability and an optimal procedure in dependence on the material to be treated, and the material can be best kept in a softened, lumpy, non-melted state.

In this connection on the one hand it is advantageous to place the mixing and comminution tools on a common rotating shaft, since in many situations this is efficient and ensures sufficient processing. On the other hand, it can be advantageous, especially in view of the variable processing mentioned above, to run the mixing and comminution tools via separate drives.

The means allowing exchange of material between the chambers to penetrate the particular intermediate bases completely according to one advantageous embodiment of the invention. In this way, the material can be directed from the chamber that lies upstream in the flow direction and be brought into the next chamber situated downstream. For design reasons it is especially advantageous that material leaving from the topmost chamber is moved directly through the intermediate base. On the one hand, thereby the spatial requirement is lessened, and on the other, such openings in the intermediate bases are completely surrounded by receptacles, ensuring a stable temperature. If for example the materials are passed via external piping into another container or another chamber, then under certain circumstances it may be required that these pipes or feed mechanisms be heated, so as not to impair processing of the material.

In this connection it is advantageous if, for example when chambers have the same diameter, the material is brought from the upper chamber through the intermediate base directly into the lower chamber, and in this way it falls, so to speak, from above into the lower chamber. In this embodiment, the intermediate base represents a horizontal partition between the two chambers that is fully penetrated by the exchange media. Such a connection of the chambers is structurally very simple, space-saving and efficient.

Especially with chambers having different diameters in which for example the upper chamber is of a larger diameter than the chambers situated farther downstream, it can also be advantageous that the material exiting from the uppermost chamber is brought not from above but rather laterally while penetrating the side wall of the chamber lying farther below.

In this way, a variation can be made in advantageous fashion of whether the delivery is made above or below the material level.

The exchange media can in advantageous fashion be configured about the central rotating shaft and/or in the area close to the side wall of the receptacle or in the radial end area of the mixing and comminution tools. The positioning of the means is dependent on the r.p.m. and the intensity of the processing and can in this way be varied in advantageous fashion. To maximize path length and dwell time, it is advantageous if the media in the individual intermediate bases are not placed directly one over the other, but rather on opposite sides at a maximum distance from each other.

According to one advantageous embodiment, the means are configured either as openings or covers permitting free passage over their entire width in the clear, which can be implemented very simply in design terms and are easy to maintain. Also, the media can be configured as labyrinths, which additionally increase the dwell time of the material. To make possible control over the dwell time, it is advantageous to provide the means with covers or slides. In this way, control can be implemented regarding when and to what degree material passes from one chamber into the next one. Also, it is possible to configure the means as actual feeding and dosing means, for example, as feeding screws, which understandably are also suitable for dosing. In this way, it is quick and easy to react to differing raw materials. If, for example, thick flakes are inserted into the uppermost chamber, after thin foils have previously been processed, then it may make sense to increase the dwell time of the now more coarse material in the topmost chamber through reduction of the exit opening in the intermediate base, to ensure sufficient handling. Such mechanisms thus permit a more variable carrying out of the procedure.

As an alternative to that, it is also possible that the exchange media are configured so that they do not penetrate through the intermediate base, but rather ensure the flow of materials to a chamber lying below while not penetrating through the intermediate base but rather while penetrating the side wall of this chamber. Thus the treated material flows from the topmost chamber through the side wall, and is conducted into a chamber placed downstream either laterally or from above. The exchange media can be configured in the same way as below.

In addition, provision can be made in advantageous fashion that preferably in each chamber a suctioning device is provided to remove volatile components and/or a device can be placed for rinsing with inert gas or reactive gases. It can also be advantageous to enable the entire mechanism to be centrally evacuated. Thus for example during treatment it is advantageous to adjust the pressure in the topmost chamber with the highest temperature to be as low as possible, to make possible an optimal increase in viscosity through polycondensation. With this as a rule the topmost chamber is charged with the most moist material, resulting in a larger pressure drop due to the large amounts of humidity which accompany an increase in temperature. If a single vacuum pump is used for the entire receptacle, the pressure in the lowest intermediate base would likewise fall, through which no polycondensation would occur, or only to a reduced extent. Among these aspects it is advantageous if every area or every chamber is able to be evacuated by its own vacuum pump. In principle instead of suction, inert gas rinsing could be done with nitrogen or carbon dioxide, through which not just moisture, but also other volatile components such as smelly substances could be suctioned out.

In addition it is advantageous, preferably in each of the chambers, to provide a filling level gauge, which ensures that the flow-through of material is better able to be checked and controlled. Depending on the filling level in the particular chamber, the r.p.m. or adjustment of covers of the exchange medium can be governed.

An advantageous mechanism with an upper chamber having a larger diameter offers an advantage in that in this way, processing of the not fully melted material can be positively influenced. In addition, by this means, using a simple measure, the receiving capacity in the topmost container can be increased. Formation of a topmost chamber with a large or larger diameter also offers an advantage in that in this way the plastic material can be processed more effectively, and adapted to the particular circumstances, especially comminution and pre-homogenizing.

In essence the procedure disclosed herein guarantees the advantages named above, especially in that by that means it is possible to process or prepare plastic material effectively.

Further advantages and embodiments of the invention can be gleaned from the specification and the appended drawings.

BRIEF DESCRIPTION OF THE DRAWINGS

The invention is schematically depicted using exemplary embodiments in the drawings and is described as follows by way of example while referring to the drawings.

DETAILED DESCRIPTION

Figure 1:
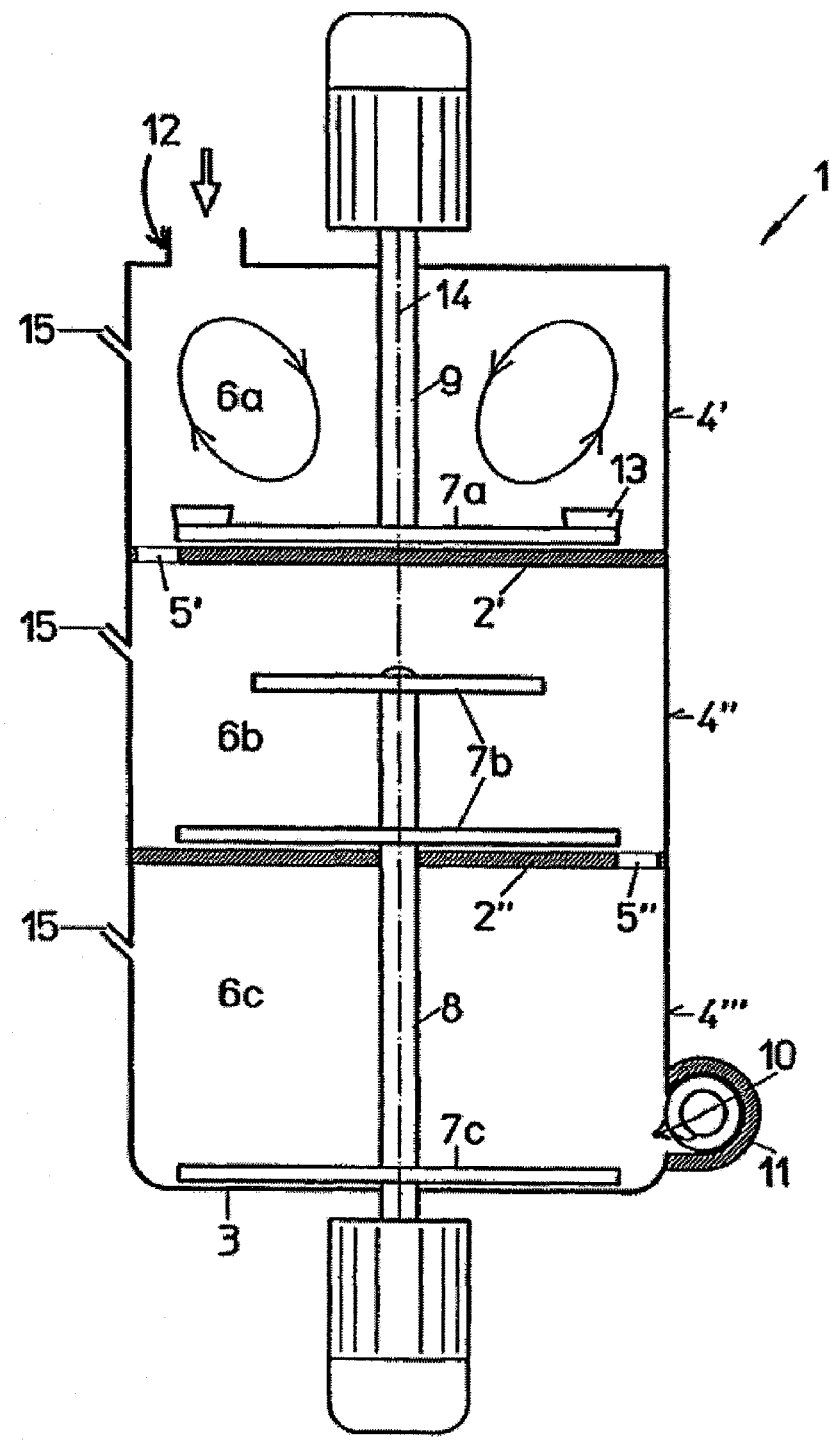
FIG. 1 shows a first embodiment of a mechanism with three chambers of equal diameter, placed one above the other.

FIG. 1 shows an embodiment of a mechanism for treatment of thermoplastic material, especially recycled goods or packaging waste or the like, which comprises a receptacle or cutter-compactor 1. The material can be inserted from above via an insertion opening 12 into receptacle 1 and gets into uppermost chamber 6a. This chamber 6a has a cylindrical shape and is equipped with a mixing and comminution tool 7a. Mixing and comminution tool 7a is connected via a rotating shaft with a drive unit and can be put into rotary motions. Mixing and comminution tool 7a is situated in the base area of topmost chamber 6a and is governed or configured so that it exerts a mixing, heating, and, if necessary grinding effect on the plastic material. The material is put into rotation and a mixing funnel is formed. With this, two arms that are placed normal to the longitudinal axis 14 of the overall device or to rotating shaft 9 can be configured which are equipped with working edges 13 that act on the plastic material. These working edges 13 run so that on the one side they perform a pulling cut on the plastic material situated in the edge area of receptacle 1, and on the other side they feed the ground material as much as possible into a removal opening 5'.

Other liquid or solid additional materials or fillers can be added into topmost chamber 6a. They can be added either via the insertion opening 12 or also in an area below the material level in chamber 6a.

Directly beneath topmost chamber 6a, another center chamber 6b is placed. Center chamber 6b has the same diameter as topmost chamber 6a. The two chambers, 6a and 6b, are spatially separated from each other by an intermediate base 2', with the intermediate base in the same way forming the lower base of topmost chamber 6a, as well as the upper covering of center chamber 6*b*. Between chambers 6*a* and 6*b* a means 5' is provided, which makes possible a transfer or transport of the softened, lumpy, non-melted material from upper chamber 6*a* into chamber 6*b* lying beneath it. The material pretreated in topmost chamber 6*a* can thus drop by gravity from topmost chamber 6*a* into further chamber 6*b*.

Additionally in topmost chamber 6*a* a suction device 15 is provided, through which volatile components such as water vapor or odor-causing compounds that condense from the material can be withdrawn. It is also possible to pass an inert gas stream through the suction device 15 or by means of it, through chamber 6*a*.

In center chamber 6*b* that is farther below or which is placed downstream, mixing tools 7*b* are also situated. In the present case these are two mixing devices that lie one atop the other, which are supported on a common rotating shaft 8 and set the material in chamber 6*b* in motion and process in the same way as in chamber 6*a*. Rotating shaft 8 is not connecting with the same drive unit as rotating shaft 9 of upper chamber 6*a*, but rather with a drive unit that is placed at the opposite end of the device. In this way, the r.p.m. of mixing tool 7*b* can be set independently of the r.p.m. of mixing tools 7*a*.

Below or downstream of chamber 6*b*, another chamber 6*c* is placed. This lowest chamber 6*c* has the same size and same diameter as the two upper chambers 6*a* and 6*b*. Also in the bottom chamber 6*c*, a mixing tool 7*c* is provided which operates as described above. Chamber 6*b* is spatially separated from lowest chamber 6*c* by intermediate base 2". To ensure a material flow, a means 5" is placed in intermediate base 2", which ensures an exchange of the softened, lumpy material exiting from center chamber 6*b* into lowest chamber 6*c*.

Thus, the three chambers 6*a*, 6*b*, 6*c* are of equal size, lie directly one atop the other, and form cylindrical receptacle 1. Side walls 4', 4" and 4''' of the chambers, lying one atop the other, form the side wall 4 of receptacle 1. Via the two intermediate bases 2', 2", receptacle 1 is subdivided into the three chambers 6*a*, 6*b*, 6*c*, but nonetheless a single, unitary, space-saving receptacle 1 exists, not several individual containers connected with each other.

Through the formation of intermediate bases 2', 2" thus no raw material can flow unhindered and undefined to the extruder. The two means 5' 5" do not lie in alignment one over the other, but are placed radially at opposite ends of the intermediate bases 2', 2". In this way the dwell time spectrum can be increased and the path of the material can be lengthened. The two means 5', 5" lie at the end area of the radii or regions covered by mixing and stirring tools 7*a*, 7*b*.

Also in chambers 6*b* and 6*c*, suction devices 15 are provided, to remove volatile components not yet released in topmost chamber 6*a*. In this way, the material can be effectively purified.

In lowest chamber 6*c*, a removal opening 10 is placed in the side wall 4'''. By means of mixing tool 7*c*, the plastic material is inserted in troweled fashion into this removal opening 10, which essentially lies at the same level as mixing tool 7*c*. In a further sequence, an extruder 11, in which the material is compacted and melted, is attached to this removal opening 10.

The plastic material thus moves in the following way: the material is inserted via the insertion opening 12 into topmost chamber 6*a*, and is there processed by mixing tools 7*a*. Especially the material is ground and also heated by the energy transferred via the mixing tools 7*a*. Likewise, the material can be dried in topmost chamber 6*a*, which is of especially great relevance with PET. The material can also be pre-crystallized. With this it is essential that the material in topmost chamber 6*a* is not melted on at any point, but rather is present in a softened state, especially in the vicinity of the Vicat softening temperature of the polymer to be treated. In advantageous fashion the required temperature can be set and regulated by the mixing tools 7*a*, especially by their rotational speed and/or the configuring of the cutting edges 13. Due to the chambers being relatively small, temperatures can be regulated and altered quickly. In addition, mixing tools 7*a* prevent the plastic particles from sticking together and allow the material by that means to flow and be agitated.

Then the material is brought via means 5' through intermediate base 2' from chamber 6*a* into chamber 6*b*. With this, means 5' is configured in the present embodiment form in the shape of a closable opening or cover. In this way, the material flow can be regulated and the dwell time of the material adjusted in topmost chamber 6*a*. As an alternative, a feed screw or dosing screw can be provided. In chamber 6*b*, the material also is now subjected to processing by mixing tools 7*b*, with no melting of the material occurring here as well.

The material is then transferred by means 5" through intermediate base 2" further downstream into the lowest chamber 6*c*, and there is further processed by mixing tools 7*c*.

Then the material is withdrawn through removal opening 10 from receptacle 1, having undergone a three-stage processing and pre-homogenizing, which in advantageous fashion has prepared the material optimally for the upcoming melting operation in the extruder.

Figure 2:
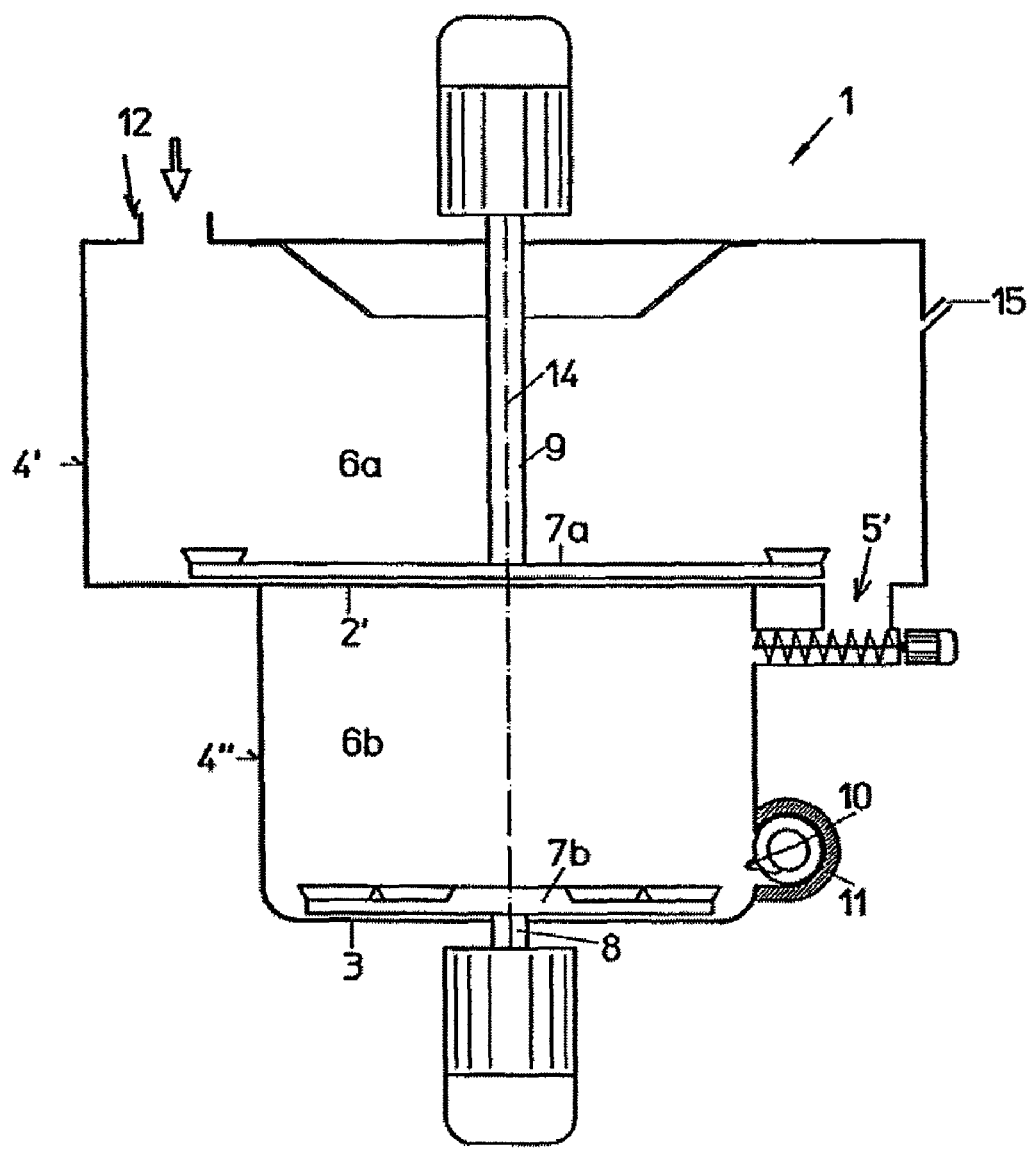
FIG. 2 shows another embodiment with two chambers of differing diameter placed one above the other.

An alternative embodiment is provided in FIG. 2. The device comprises a receptacle or cutter-compactor 1, into which material can be brought from above via the insertion opening 12 and which likewise has a removal opening 10, through which, after processing, the material can be extracted in the direction of an extruder 11. In contrast to the device as per FIG. 1, the device as per FIG. 2 comprises only two chambers 6*a* and 6*b* that lie one above the other. In both chambers 6*a* and 6*b*, mixing and comminution tools 7*a*, 7*b* are placed. True, the diameter of upper chamber 6*a* is greater than the diameter of chamber 6*b* that is lower, lying downstream. Thus, the side wall 4' of upper chamber 6*a* and the side wall 4" of lower chamber 6*b* do not form a cylindrical receptacle 1, but rather a receptacle 1 that appropriately is different in shape. Nonetheless, the result is a single unitary receptacle 1, and not two containers spatially separated from each other. This is not impaired by the circumstance that chambers 6*a*, 6*b* have differing diameters.

The upper chamber 6*a* is separated from lower chamber 6*b* by an intermediate base 2', with now a circular ring-shaped area provided in the outer radius of this intermediate base 2', which projects out over the circular surface of the diameter of lower chamber 6*b*. In intermediate base 2' in this circular ring-shaped outer area, a means 5' or a hole is provided which penetrates intermediate base 2' completely, by which, however, no direct vertical connection is formed between chamber 6*a* and chamber 6*b*, as in FIG. 1, in which the material drops from above into lower chamber 6*b*. Deviating from the device as per FIG. 1, means 5' as per FIG. 2 is so configured that the material first drops vertically from above or is inserted, and then is brought through a turnover section in the form of a tube or a feeding screw through side wall 4" of lower chamber 6*b*, into this chamber 6*b*. In this way, it can be varied whether the material is inserted above or beneath the material level in chamber 6*b*, depending at what level the means 5' empties into chamber 6*b*. The throughput can also be controlled.

In FIG. 2, the means 5' is just outside the radius of the upper mixing and comminution tool 7*a*, through which the softened, lumpy, non-molten material simply and efficiently drops or can be inserted into means 5'.

Understandably, additionally other means 5' can be provided which are configured to be farther in radially and which, like in the device according to FIG. 1, fully penetrate intermediate base 2', through which the material, also like FIG. 1, is able to be brought from upper chamber 6a directly vertically from above into the underlying chamber 6b.

The material flows similar to FIG. 1 from chamber 6a, in which the material can be pretreated, but not melted on, via means 5' in chamber 6b, with the material undergoing a further treatment in chamber 6b. Thus it is not possible for untreated raw material to directly enter into the extruder worm gear 11.

Also in FIG. 2, the two mixing tools 7a, 7b of the different chambers 6a, 6b can be controlled separately from each other via the differing drive units or tube shafts 8, 9, with the drive units here also situated at opposite positions relative to the mechanism.

Figure 3:
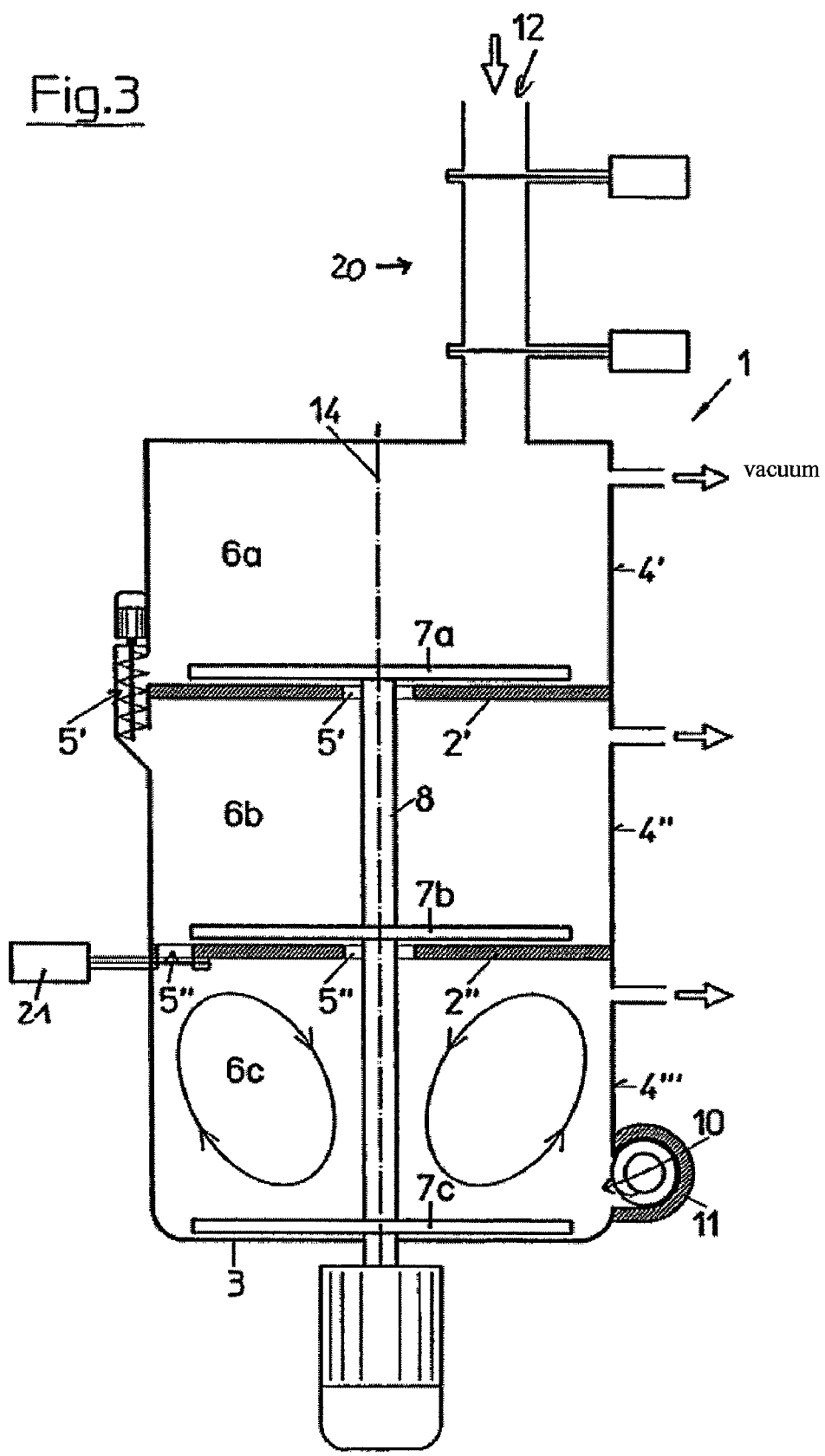
FIG. 3 shows an alternative embodiment of FIG. 1.

FIG. 3 shows a further embodiment of the invention. As in FIG. 1, the receptacle or cutter-compactor 1 is divided or subdivided into three chambers 6a, 6b, 6c placed one above the other, with the diameter of the individual chambers being equal and the side walls 4', 4", 4''' forming a unitary cylindrical receptacle 1. Differing from FIG. 1, the mixing devices 7a, 7b, 7c present in each chamber 6a, 6b, 6c are placed on a common rotating shaft 8 and thus can only rotate with common r.p.m. or with the same r.p.m.

In a customary manner, chambers 6a, 6b, 6c are separated by intermediate bases 2', 2" and connected with each other in material-flow terms by means 5', 5". The means 5', 5" are differently configured as compared with FIG. 1. Between topmost chamber 6a and center chamber 6b, a means 5' is provided, which is placed centrally radially about rotating shaft 8. Besides that, an additional means 5' is provided, which in contrast to the previous means does not penetrate through the intermediate base, but rather only cuts through the side walls 4', 4" of the two chambers 6a, 6b that lie one atop the other. Thus the material can be brought through sidewall 4' of topmost chamber 6a from this chamber 6a and is inserted via means 5', in this case a feeding or dosing screw, while penetrating sidewall 4" of chamber 6b lying below into it. Thus this means 5' lies outside chambers 6a, 6b or outside sidewalls 4', 4". In this case attention is to be paid to the temperature in this means 5' or insulating and/or heating devices for this means 5' may make sense.

Intermediate base 2" between center chamber 6b and lowest chamber 6c also has a means 5" which is placed centrally about rotating axle 8. In addition, another means 5" is situated which is configured as an adjustable opening over a slider 21, and which penetrates intermediate base 2". This means 5" is in the outer radial area of mixing tool 7b.

Otherwise the device is configured the same as in FIG. 1.

The material is fed via insertion device 12 in advantageous fashion via a regulating or controlling device 20, as for example a bucket wheel lock, a slider system or a screw feed system.

In addition, provision can be made that preferably a fill level meter 16 be provided in each chamber 6a, 6b, 6c, to determine the height of the material in each chamber and the procedure can be adapted at any time to the r.p.m. of mixing tool 7 or by adjusting the opening width or porthole of means 5.

The cover of receptacle 1 in addition can be designed to be heated or cooled, for example by heating or cooling hoses or by a dual cover. Thus, each section or each sidewall 4', 4", 4' of each chamber 6a, 6b, 6c can be cooled or heated separately from the others. The mixing tools 7a, 7b, 7c can also be designed so they can be heated or cooled.

In addition, it would be possible to provide each chamber 6a, 6b, 6c with its own removal opening 10, via which the material can be passed to an extruder 11.

Figure 4:
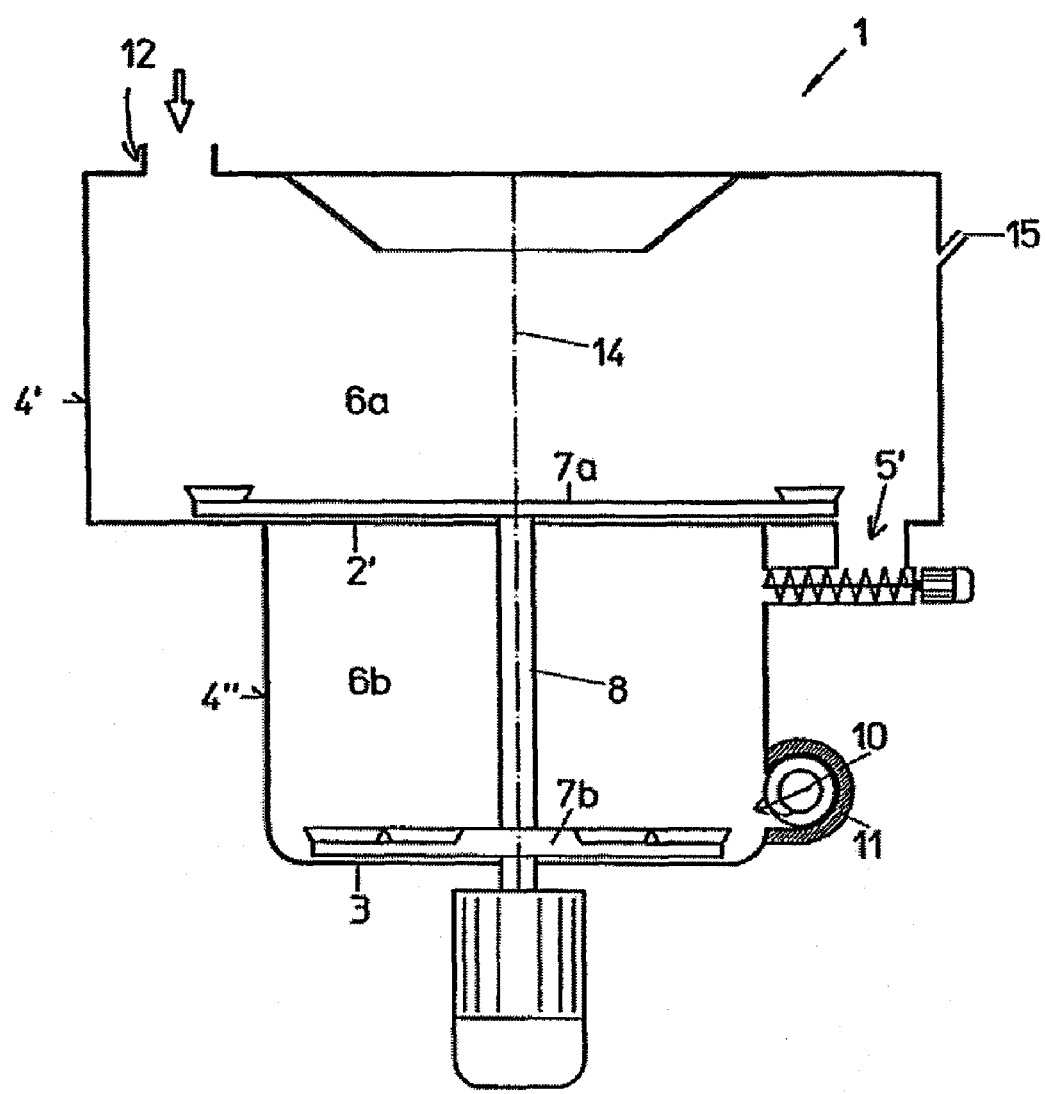
FIG. 4 shows an alternative embodiment of FIG. 2.

FIG. 4 shows an exemplary mechanism which in essence corresponds to the embodiment as per FIG. 2. The mixing and comminution tools 7a, 7b are situated on a common rotating shaft 8 and moved via a single drive motor, and thus are coupled or synchronized for identical motion.

The invention claimed is:

1. A device for treatment of plastic material, comprising:
a receptacle into which the material can be brought for processing, comprising a removal opening in a lower part thereof, through which the processed material can be removed from the receptacle, wherein the receptacle is subdivided into at least two chambers that are separated from each other by an intermediate base;
at least one mixing or comminution tool situated in each chamber, wherein the material can be brought into a softened but permanently lumpy or particle-shaped and non-molten state by the mixing or comminution tool; and
means that cause or allow an exchange or a transfer of the softened, lumpy, non-molten material between adjacent ones of the chambers;
wherein a topmost one of the chambers has a greater diameter than other ones of the chambers that lie below in the direction of material flow.

2. The device according to claim 1, wherein the chambers are disposed one above the other and the material flow is directed from the topmost chamber, into which the material to be treated can be inserted, downward into the other chambers.

3. The device according to claim 1, wherein the topmost chamber has a lesser height than the other chambers.

4. The device according to claim 1, wherein the mixing or comminution tools are configured so that the material is brought into a softened state, but remains permanently lumpy or particle-shaped and does not melt.

5. The device according to claim 1, wherein the mixing or comminution tools are configured to rotate at different speeds.

6. The device according to claim 1, wherein all of the mixing or comminution tools are placed on a common through-running rotary shaft.

7. The device according to claim 1, wherein the means that cause or allow the exchange or transfer of the material between adjacent chambers are disposed in the intermediate base of each chamber.

8. The device according to claim 1, wherein in chambers with substantially equal diameters, the means are situated in the intermediate base between two chambers.

9. The device according to claim 1, wherein in chambers having differing diameters, the means from a chamber lying relatively higher up empty into an adjacent or following chamber that lies farther below.

10. The device according to claim 6, wherein the means are disposed about the rotary shaft.

11. The device according to claim 1, wherein the means are openings or covers.

12. The device according to claim 1, wherein the means extend outward from each chamber that relatively is situated higher, and form a material flow connection into an adjacent chamber lying farther below in the direction of material flow.

13. The device according to claim 1, further comprising a suction device configured to remove volatile components.

14. The device according to claim 1, further comprising a filling level meter.

15. A method for treatment of plastic material, comprising:
providing a device, the device comprising:
- a receptacle into which the material can be brought for processing, comprising a removal opening in a lower part thereof, through which the processed material can be removed from the receptacle, wherein the receptacle is subdivided into at least two chambers that are separated from each other by an intermediate base;
- at least one mixing or comminution tool situated in each chamber, wherein the material can be brought into a softened but permanently lumpy or particle-shaped and non-molten state by the mixing or comminution tool; and
- means that cause or allow an exchange or a transfer of the softened, lumpy, non-molten material between adjacent ones of the chambers;
- wherein a topmost one of the chambers has a greater diameter than other ones of the chambers that lie below in the direction of material flow;
- guiding the material consecutively through the chambers;
- processing the material with the mixing or comminution tools to thereby bring the material into a softened, non-molten state in which the material permanently remains lumpy or particle-shaped, and keeping the material wholly in this condition; and
- subjecting the material after a last one of the chambers to a densification step and bringing the material out into an extruder.

16. The method according to claim 15, further comprising transporting the material from chamber to chamber through the receptacle into the intermediate bases that subdivide the individual chambers.

* * * * *